Feb. 2, 1937. J. B. ARPIN 2,069,715
ARTIFICIAL REEF
Filed Oct. 29, 1935
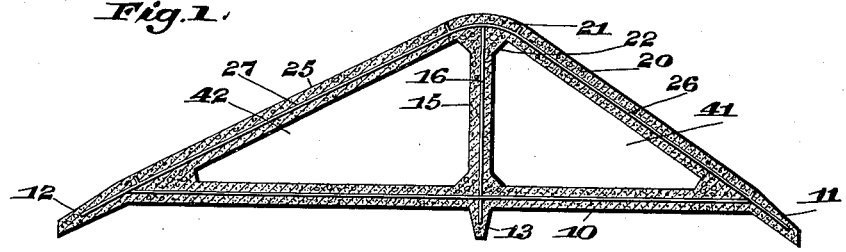
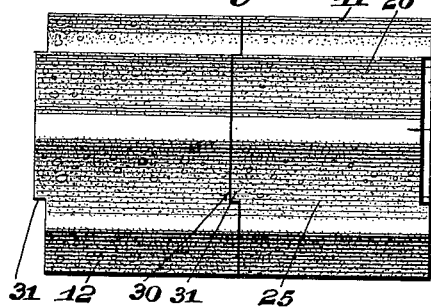
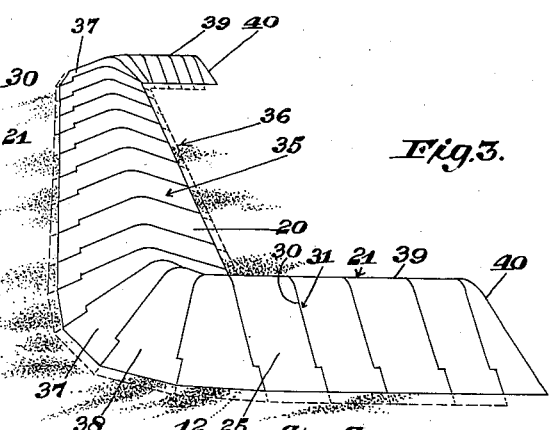
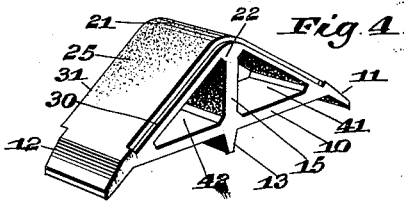
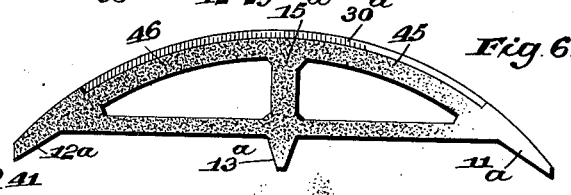
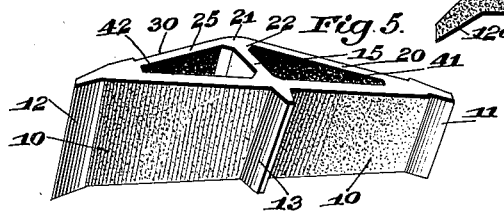
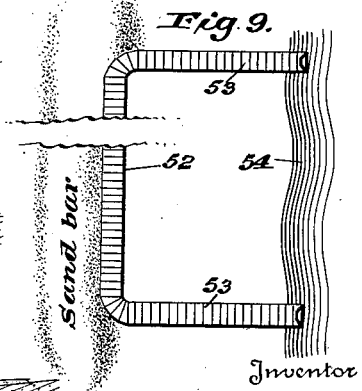
Inventor
John B. Arpin.
By Munn, Anderson & Liddy
Attorney Patented Feb. 2, 1937

2,069,715

UNITED STATES PATENT OFFICE 2,069,715

ARTIFICIAL REEF

John B. Arpin, Fort Lauderdale, Fla., assignor to Beach Erosion Control Company, Miami, Fla., a corporation of Florida Application October 29, 1935, Serial No. 47,312

6 Claims. (Cl. 61—4)

This invention relates to a reef structure.

An object of the invention is the provision of an artificial reef which is adapted to be placed adjacent a seashore below the water level for not only preventing erosion of the beach but to build up a beach at a high level where desired.

Another object of the invention is the provision of a reef which may be U-shaped and may be formed of any suitable material with the cross sectional area being substantially triangular while the apex or crown portion of the reef being rounded so that when the crest of the wave passes over the curved surface breakers will not be formed which will tend to produce eddying current that will wash away the beach at either side of the reef.

Another object of the invention is the provision of a reef which will prevent the damaging action of the waves while at the same time assisting in building up the beach by the natural action of the waves before they break so that they will carry sand up the gentle slope of the reef until such time as the reef is completely covered. At this time the sand will continue its forward movement until the whole enclosure formed by the reef is filled to carry out the natural slope of the beach. All reefs are placed out beyond the point where the waves break on the shore so that when the reefs are held in place by the weight of the reef the water will be guided over the gentle sloping walls of the reef while the downward pressure of the waves will tend to maintain the reef in position until the sand is built up into the form of a natural sloping beach at the land side and also forwardly of the water side.

A still further object of the invention is the provision of a reef which when dropped into place will become embedded in the sand to such an extent that there is no danger of any currents getting beneath the said reefs, the reef being provided with penetrating means at the edges of the sloping sides and intermediate said sides.

A still further object of the invention is the provision of a reef so designed that it will not allow the sand to be carried out to sea due to the back-wash during a storm and which will tend to reduce the size of the wave due to the adverse currents which result when the crest of the wave passes over the reef, the reef being formed of steel, gunnite, or reinforced concrete.

A still further object of the invention is the provision of a reef so designed that when placed in soft material the reef can be sealed so as to prevent any material other than water to enter, and also so designed that the slopes may be increased so as to give the reef a greater bearing surface; so as to provide for the downward pressure exerted by the wave action, depending on the depth of water between the reef and the surface.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:—

Figure 1 is a transverse vertical section of a reef constructed in accordance with the principles of my invention, Figure 2 is a plan view of a section of the reef, Figure 3 is a view in perspective of a reef shown applied to a beach, Figure 4 is a view in perspective of a section of the reef forming one of the units, Figure 5 is a view in perspective of a section of the reef showing the bottom construction, Figure 6 is an end view in elevation of a modified form of a section, Figure 7 is a vertical section of a beach showing my reef used in connection with groins, Figure 8 is a similar section without the groins, and Figure 9 is a plan view of a U-shaped reef applied to a beach.

Referring more particularly to the drawing, it will be seen that the reef is formed in sections which are triangular in cross section and which may have the top walls substantially the same length or the inclined top walls may be of variable length. The abutting ends of the sections are provided with complementarily interfitting portions whereby these sections may be neatly assembled to present a smooth surface throughout their length. Furthermore, the sections when fitted together will form a U-shaped reef which is applied to the beach below the water level either in conjunction with a groin or without the groin whereby the beach will be built up from the reef towards the land side and also be built up towards the water side.

Each section includes a base member 10 formed of reinforced concrete, metal, or any other suitable material and this base member has an outer flat surface with inclined toes 11 and 12 at its opposite ends and a lug 13 intermediate its ends. These toes and lugs, as shown more particularly in Fig. 5, extend the full width of each section to provide means for anchoring the sections to the beach.

Rising from an intermediate portion of the base member 10 and in alignment with the transversely disposed lug 13, is a reinforcing wall 15 which is also reinforced as shown at 16. In this instance the wall is formed of concrete as are all of the parts of the sections and each section is cast from a mold.

An inclined roof or wall 20 extends from the toe 11 to a crown portion 21 where it is connected to an enlarged portion 22 of the reinforcing wall 15.

An inclined wall 25 which may be longer than the wall 20 extends from the enlarged portion 22 of the wall 15 and terminates in the elongated toe 12. It will be noted that the toes 11 and 12 are continuations of the inclined walls 20 and 25, respectively. The inclined walls 20 and 25 are also reinforced as shown at 26 and 27, respectively.

One end of each section is provided with a groove or channel 30 which is adapted to receive a complementarily formed projection 31 on an end of an adjacently disposed section. The channel or grooves and the projections 31 aid in maintaining the sections in alignment. The grooves and complementarily formed tongues or projections 31 may be of any length desired.

Referring more particularly to Fig. 3 it will be seen that a plurality of sections, generally designated by the numeral 35, are fitted together to form a straight portion 36 of a reef. At the opposite ends of the straight portion, specially constructed sections 37 and 38 are placed to provide an angular turn to receive the rearwardly extending portions or wings 39. This construction provides a U-shaped reef having the inner ends of the wings 39 closed by members 40 specially constructed for the purpose. The closing of the ends of the wings will prevent sand from entering the hollow chambers 41 and 42 of the sections since the wet sands when filled into the chambers would tend to place too much weight upon the reef and cause it to sink to a greater depth in the sand than would be desired.

When the sections are placed in position the studs 13 and the toes 11 and 12 will penetrate the sand and aid in anchoring the sections of the reef to the shore.

A modified form of the invention is shown in Fig. 6 in which the inclined walls 45 and 46 are included in an arc of a circle to provide a completely rounded outer surface which is presented to the action of the waves. This form also includes the elongated toes 11ª and 12ª and the tapered elongated lug 13ª which is in vertical alignment with a reinforcing wall or partition 15ª. This type of section is also provided with a groove 30ª at one edge and a complementarily formed tongue or projection at the opposite edge.

In all of the forms disclosed each section is cast uniformly so that the sections may be carried to the beach and placed in position and the weight of each section is sufficient to cause the toes and lugs to penetrate the sand of the beach.

Referring more particularly to Fig. 7 it will be seen that the reef is employed in connection with a groin 47 which is placed adjacent the land side so that the sand will be built up gradually from the reef and tapering towards the land side as shown at 48. The sand is also built up on the water side as shown at 49 in a gradual manner.

In Fig. 8 the groin is eliminated showing how the beach is built up at 50 between the reef and the shore and also how the sand is built up at 51 on the outer side of the reef.

Fig. 9 shows a U-shaped reef generally designated by the numeral 52 having wings 53 which extend to the shore 54. The sand in each instance is carried over the outer front face of the reef and into the enclosed sections formed by the wings 53 and built up gradually until the shore line appears as is illustrated in Figs. 7 and 8.

When the reef is placed in position parallel to a beach or any shore line it will cause a diminishing of the size and force of the waves at this point. The toes which extend the full width of each section and form a continuation of the gently sloping walls, will prevent undermining the structure because an erosive swirl is prevented by the gentle slope on either side of the reef. Adverse currents are also prevented by the rearwardly turned wings 39 since these wings continue to the shore line. The particular construction and submergence of the reef below the water line eliminates the abrasive action or the impact of the waves which would ordinarily damage the structure when placed at or near the water line. The particular construction of the reef when dropped into place makes it immovable because the angle of the slopes on either side of the reef converts the action of the waves into a gentle downward pressure and the bearing surface of the reef is sufficient to prevent its settling into the sand while the weight is sufficient to insure that the structure will rest on the bottom.

I claim:

1. A reef structure comprising an elongated U-shaped member being substantially triangular in cross section and hollow, the outer longitudinal edges at the base portion having inclined soil-penetrating toes, the portion of the base intermediate the longitudinal edges being provided with penetrating lugs.

2. A reef structure comprising an elongated member substantially triangular in cross section in which the walls forming the top covering incline outwardly and downwardly from a crown portion running longitudinally of the elongated member, the crown portion being rounded, the elongated member being formed of sections, complementary means on the inclined edges of adjacent ends of the sections adapted to be interfitted into each other.

3. A reef structure comprising an elongated member substantially triangular in cross section in which the walls forming the top covering incline outwardly and downwardly from a crown portion running longitudinally of the elongated member, the crown portion being rounded, the elongated member being formed of sections, each section at one end having a groove along the inclined edges of the walls, the opposite end having complementary members adapted to be received by the grooves on an adjacent end of a preceding section.

4. A reef structure comprising an elongated member substantially triangular in cross section in which the walls forming the top covering incline outwardly and downwardly from a crown portion running longitudinally of the elongated member, the crown portion being rounded, the elongated member being formed of sections, each section having a bottom connecting the lower ends of the inclined walls, and a reinforcing wall intermediate the ends of the section and connecting the crown portion with the bottom.

5. A reef structure formed of sections, each section comprising an inverted V-shaped member having sloping top walls, the top walls where they meet at the highest point forming a crown, a bottom connecting the top walls adjacent the lower ends so that portions of the walls project beyond the bottom, the projecting portions being tapered to provide soil-penetrating toes, a reinforcing wall extending transversely of each section and connecting the crown with the bottom, and a tapered lug projecting from the bottom and in vertical alignment with the reinforcing wall.

6. A reef section comprising a member having a downwardly sloping top wall, a bottom connecting the substantial extremities of the top wall adjacent to its lower ends so that portions of the top wall project beyond the bottom in the same general direction of the top wall, the projecting portions providing penetrating toes, a reinforcing wall between the upper side of the bottom and the under side of the top wall, and a lug projecting from the lower side of the bottom.

JOHN B. ARPIN.